Patented Jan. 31, 1950

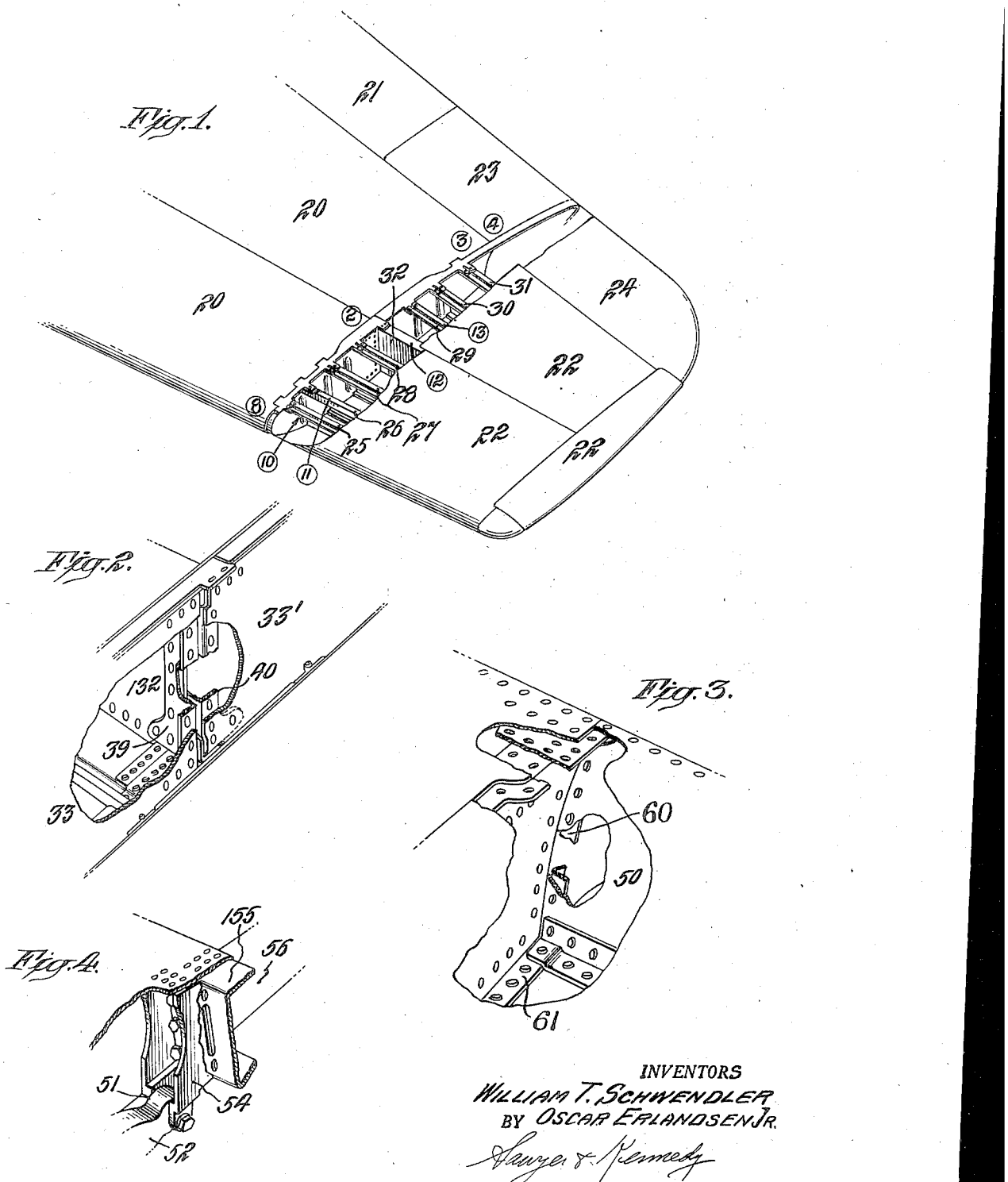

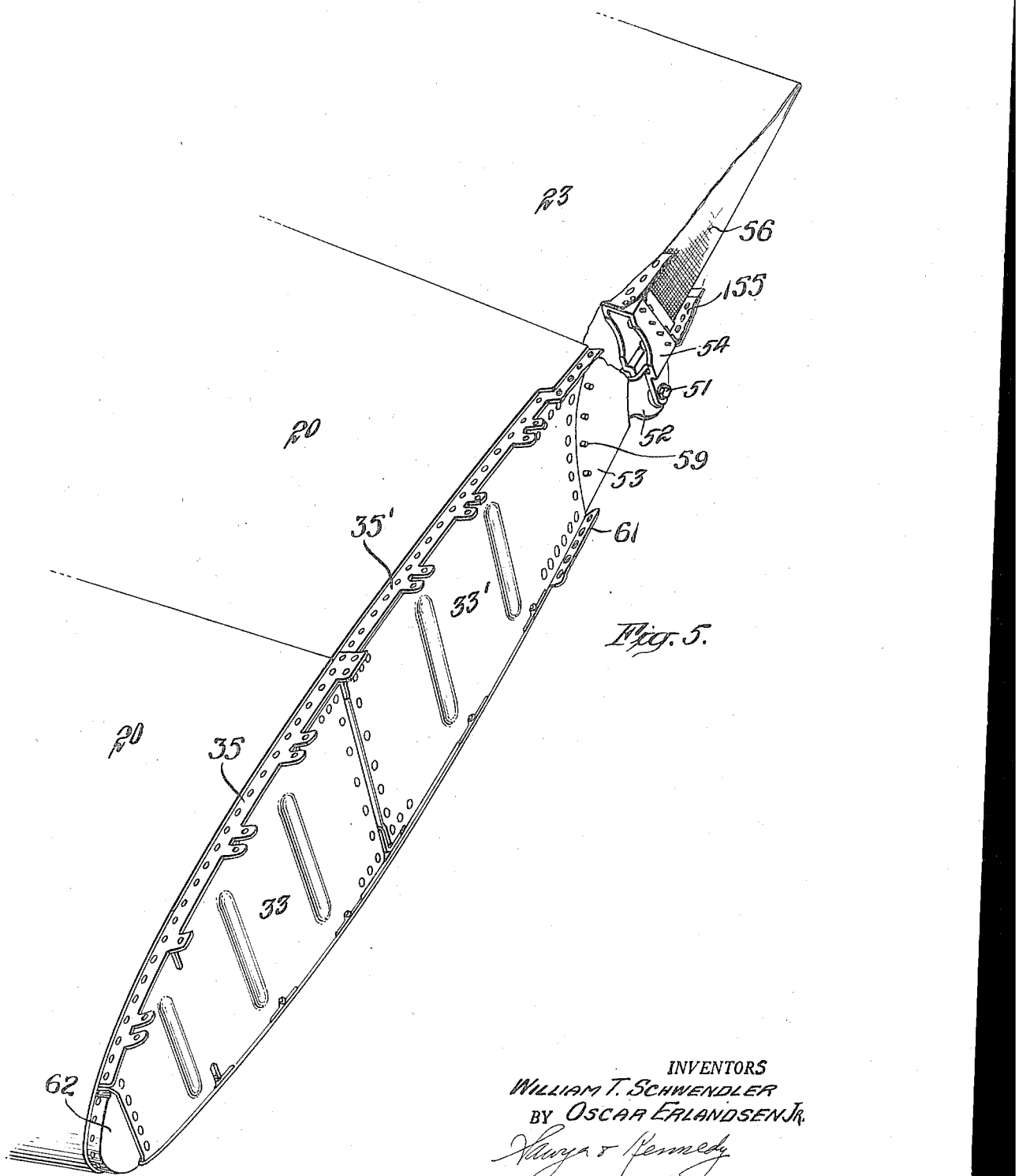

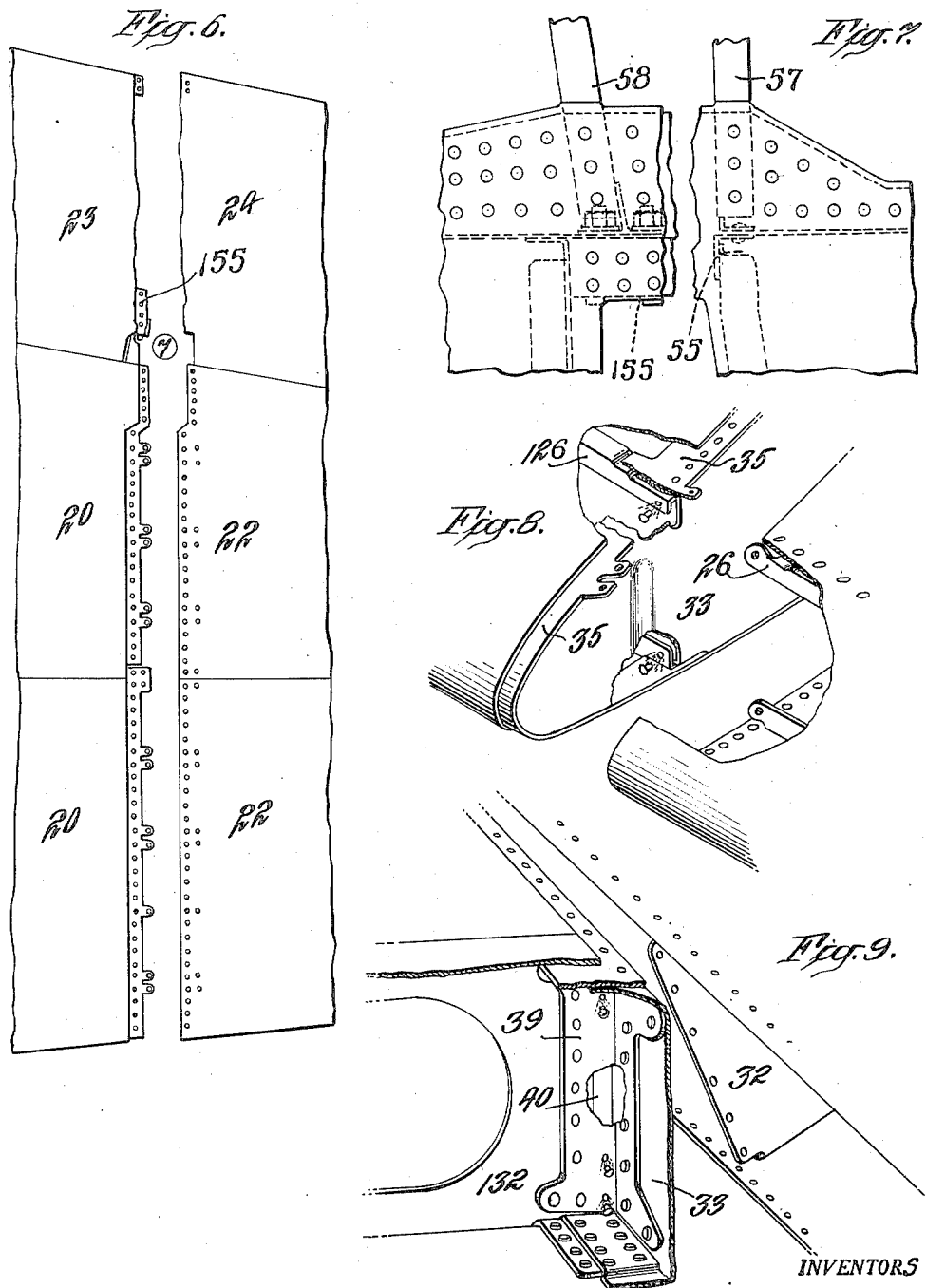

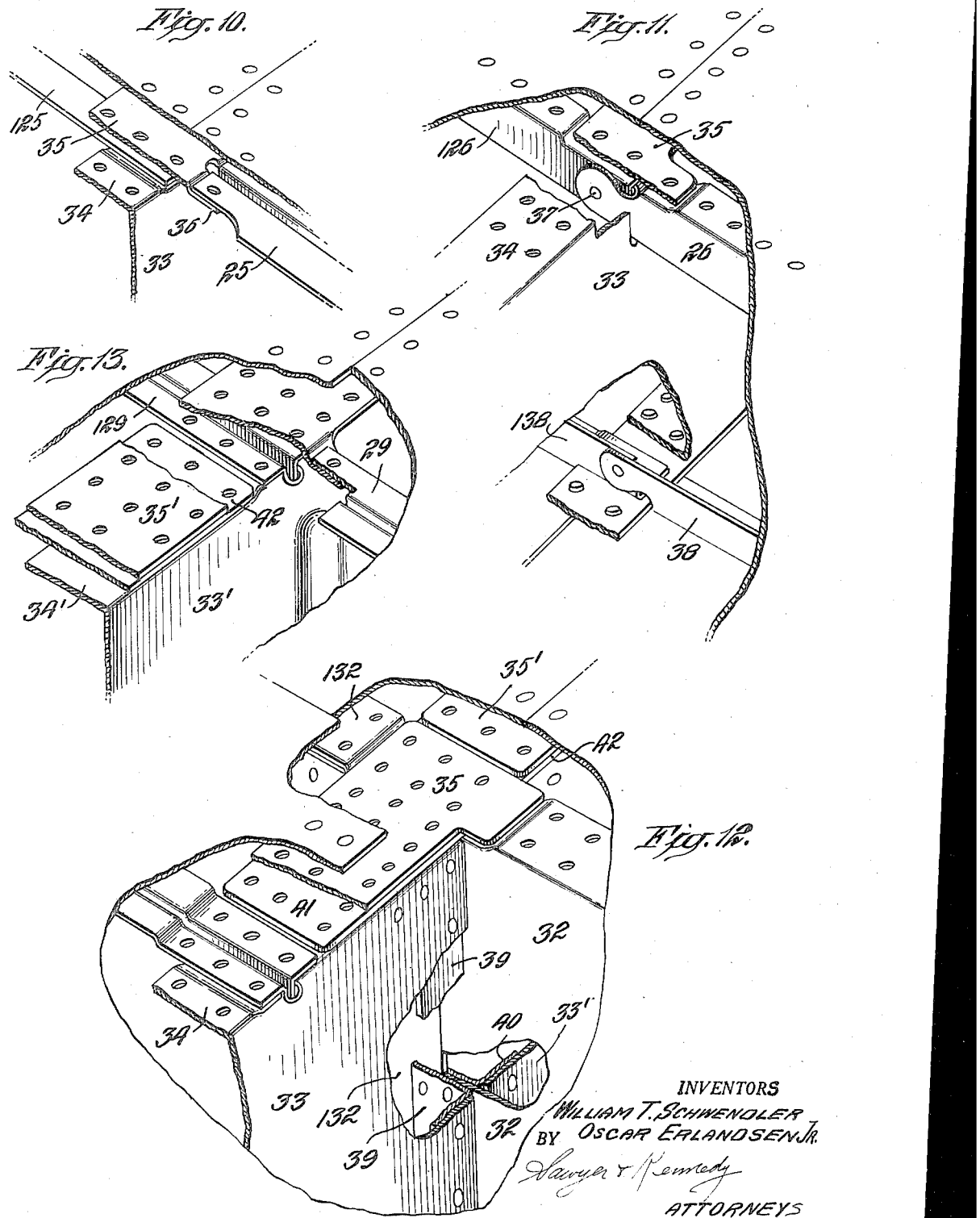

2,496,024

UNITED STATES PATENT OFFICE 2,496,024

AIRPLANE WING STRUCTURE

William T. Schwendler, Bethpage, and Oscar Erlandsen, Jr., Garden City, N. Y., assignors to Grumman Aircraft Engineering Corporation, Bethpage, N. Y., a corporation of New York Application March 12, 1946, Serial No. 653,806

6 Claims. (Cl. 244—124)

This invention relates to improvements in airplane wing structures.

It is an object of the invention to prevent failure of the wings of an airplane due to accidental overload such as that produced by pulling abruptly out of a dive or for other reasons.

More specifically, it is an object of the invention to provide a wing constructed to withstand all designed loads with a margin of safety while at the same time it is provided with a safety feature whereby an outboard portion thereof may be cleanly shed under a predetermined load so as to relieve the inboard portions of overload. The remaining inboard portion shall be of dimensions sufficient to enable the aircraft to be flown and landed safely. This object is attained by constructing the wing in two or more sections in which an outer section is joined to its inboard member by a connection designed to fail or be disconnected in response to a predetermined critical load.

With the foregoing and other objects which will appear in the following full description in mind, the invention consists in the combinations and arrangements of parts and details of construction which will now first be fully described in connection with the accompanying drawing and then pointed out more particularly in the appended claims. The construction disclosed is a practical embodiment of the invention, but it will be understood that modifications and variations may be substituted by those skilled in the art.

In the drawing:

Figure 1 is a perspective view, with the covering or skin partly broken away along the intended line of fracture, of the outboard or tip portion of a wing embodying the invention in a preferred form;

Figure 2 is a perspective view, on an enlarged scale and with still further parts broken away, showing the wing structure adjacent a spanwise spar or beam member at a location corresponding to the encircled numeral 2 of Figure 1;

Figure 3 is a perspective view on an enlarged scale and with parts broken away showing wing structure just forward of the aileron and at a location corresponding to the encircled numeral 3 of Figure 1;

Figure 4 is a view similar to Figure 3 but showing an aileron hinge and associated structure, at a location corresponding to the encircled numeral 4 of Figure 1;

Figure 5 is an enlarged perspective view of the inboard section of the wing of Figure 1, the tip section having been removed for clarity;

Figure 6 is a plan view on an enlarged scale of a portion of the wing of Figure 1 adjacent the line of separation and showing principally the separation of the wing covering or skin;

Figure 7 is a plan view on an enlarged scale, with parts omitted to show internal structure, of a portion of Figure 6 adjacent the encircled numeral 7 and showing the separation of inboard and tip aileron sections;

Figure 8 is a perspective view on an enlarged scale, adjacent the location 8 of Figure 1, and showing the separation of the parts near the leading edge of the wing;

Figure 9 is an enlarged perspective, taken from another point of view adjacent the location of the encircled numeral 2 of Figure 1, and showing the separation of the parts near the spanwise spar or beam;

Figure 10 is a view showing the joint structure at the location indicated by the encircle numeral 10 of Figure 1;

Figure 11 is a similar view showing the structure at the location indicated by the encircled numeral 11 of Figure 1;

Figure 12 is a similar view showing the structure at the location indicated by the encircled numeral 12 of Figure 1; and Figure 13 is a similar view but showing structure at the location indicated by the encircled numeral 13 of Figure 1.

It may be stated as a generality that an airplane wing forms a cantilever beam in which the bending moment increases continuously from the tip up to, or substantially up to, the juncture of the wing with the body of the aircraft. Although the lift contributed by a relatively small portion of the tip of the wing may also be relatively small, the contribution of such tip section to the total bending moment at an inboard point will be very large by comparison with the contribution of an inboard wing section producing comparable lift. It, therefore, becomes possible to relieve the wing from bending stresses, which might otherwise cause failure, by removing a tip section with a corresponding loss of lift which is, however, relatively very small. In other words, a large percentage reduction of bending moment at a possible inboard fracture point may be accomplished at the expense of a much smaller percentage reduction in over-all lift. Although wings may be designed for a wide variety of strengths under normal conditions, and a wing tip may be designed to be shed at any predetermined limit of overload, the principles involved are the same, and accordingly only a single set of conditions requires discussion for a full understanding of the invention. For example, it may be assumed for definiteness that the major elements of the wing are designed to withstand wing loads corresponding to pull outs producing centrifugal force above nine times gravity, while the connection between the outer or tip section and the inboard section may be designed to fail at nine g's, causing the tip section to be shed, and such design will permit the inboard portion of the wing to withstand wing loads corresponding to twelve g's or more, depending upon the amount of reduction of the span of the wing. The wing strength for normal flying conditions, the failure load of the connection and the strength of the inboard section with the tip section removed may be specified, if desired, in terms of the load upon the wing. Such load, however, is in any given construction itself a function of centrifugal force or, where not produced by a pull out, is translatable into such terms, so that a complete description of wing strength can be made in the foregoing terms.

Due to the difference in contribution of a tip section to lift and to bending moment, it is possible with any given design of aircraft to insure adequate lift for safe flying and safe landing with a tip section removed, since the wing as a whole will normally be so constructed as to provide the excess lift which is necessary during take-offs and rapid climb.

Referring now to Figure 1, the wing comprises an inboard section 20 including a fixed trailing edge 21, an outboard wing tip section 22, an inboard hinged aileron section 23 and an outboard hinged aileron tip section 24. The wing is designed to break along the joint between sections 20 and 23, on the one hand, and 22 and 24, on the other hand, and thus breaks through the aileron. As will be apparent from the following description, however, the invention may also be applied so as to break through a wing section having no hinged parts or through a wing section having flaps or any other hinged elements instead of a hinged aileron.

Although the invention in its broader aspects is applicable to wings of practically any desired design, it is shown for clarity and simplicity only as applied to a single spar wing structure. Basically, all wing structural members are terminated where the intended separation is to occur and form a complete wing inboard of this location. Further structural elements are connected to form continuations of the inboard elements to form the severable tip.

The upper surface of the wing tip 22 is supported upon stringers 25, 26, 27, 28, 29, 30 and 31 which may conveniently be, as shown in the drawing, formed of sheet metal in T-section or angle section, and upon the upper flange of the main spar 32. Suitable chordwise structural members of conventional type, together with the stringers and main spar 32, form the outboard or tip section of the wing which is joined to the inboard or main wing section by attaching the ends of the main spar and stringers to corresponding inboard sections. The corresponding inboard elements are identified in the detail views by corresponding reference numerals increased by one hundred and will be described in conjunction with those views.

The inboard or main wing section terminates, as best shown in Figure 5, in chordwise structural members or ribs 33 and 33', respectively fore and aft of the main spar, and which may be of any convenient form. These elements form an enclosure for the end of the inboard wing section. The upper and lower edges of the members 33 and 33' are provided with flanges in the usual way, to which flanges are attached the structural joint elements hereinafter described, and are also provided with apertures, as shown, to accommodate the spanwise stringer and main spar joints.

In Figure 10, a portion of the chordwise member 33 is shown together with a portion of the upper flange 34 thereof. The upper flange 34 is recessed to receive the inboard stringer 125 which may be riveted or welded thereto, since the attachment is permanent. A further chordwise member 35 is attached to the flange 34 and above the stringer 125 and may be fastened at this point by riveting through both members 34 and 125, as indicated. The member 35 is further provided with projecting tabs 36, in alinement with stringer 125, and to which the stringer 25 may be riveted as indicated. The tabs 36 are set slightly downward so that the upper surface of the stringer 25 will be flush with the member 35. The skins of sections 20 and 22 are butted together over member 35 and riveted thereto and to such subjacent elements as is convenient.

A different manner of attachment is employed in the case of stringer 26 and is shown in Figure 11, this element being attached to the inboard stringer 126 by means of rivet 37 passing through the webs of the two members. The web of stringer 26 passes through an aperture in the member 33 as indicated, the end of the web being shaped, and the flange being depressed as indicated, so as to permit the same to pass under chordwise member 35. In addition to the attachment of the webs of members 26 and 126 by the rivet 37, their respective flanges are also riveted to the member 35 and flange 34, as indicated. Figure 11 shows also the attachment of a lower tip stringer member 38 to an inboard stringer member 138, which, being symmetrical with the upper member and being attached in a similar way, requires no further description. Figure 8 shows the mode of separation of the wing sections adjacent the stringer 26—126.

Figure 12, and also Figures 2 and 9, show the joint at the main spar. The member 33 terminates at this joint and there is affixed to it an angle 39 which is riveted to the web of the inboard spar 132. A similar angle 40 is likewise riveted to the aft chordwise member 33' and to the web of the spar 132, the two angles 39 and 40 forming a slot outboard of the spar 132 into which the web of the spar 32 is inserted and held by rivets as shown. A further strengthening plate 41 is provided on top of the flange 34 below the member 35 and the flange of the spar 132 is riveted to this member which thus, in effect, forms an extension of the flange 34 at this point. The flange of the spar 32 passes under the top of the member 35 but is not riveted thereto. Chordwise member 34' which extends aft from the main spar is similarly fastened thereto and provided with a strengthening plate 42 similar to the plate 41 and hence requires no further description. Figure 9 shows the parts adjacent the main spar joint from an inboard point of view and in the act of breaking apart, the line of rivets which break or are forced out being indicated by loose rivets adjacent the rivet holes.

Figure 13 shows the joint which is employed in connection with the stringer 29. This view shows the rearward chordwise member 33', the upper flange 34' thereof together with rearward joining plate 35' and stiffening member 42, and the inboard and outboard stringer sections 129 and 29. The mode of attaching the sections together being similar to that of Figure 10, with the exception of the addition of the plate 42, will be clear from the description of that figure.

The structure adjacent the aileron is shown in Figures 3 to 7. As there shown, the outboard wing section terminates in a curved plate 50, behind which the aileron is hingedly supported, and this element is contnued inboard of the rib 33' by a similar element, not shown. The aileron is supported from the wing sections by hinges spaced along its length, only one of these hinges, 51, being shown. The hinge 51 includes a member 52 fastened to the wing section behind plate 53 and a member 54 supporting the aileron and attached to spanwise structural member 155 thereof. The inboard portion of the aileron includes a fabric partition covering 56 which serves to enclose its end when the outboard section is removed. Where a fabric covering aileron is utilized, the fabric is merely permitted to tear when the wing tip comes off, as indicated in Figures 5 and 6, being attached to the structural elements shown in Figure 7, and in particular to chordwise members, such as the member 57 and 58, which serve to define a line of separation. The rigidity of the structure adjacent the aileron is increased, without interfering with the separation of the parts, by pins 59 (Figure 5) which pass through apertures in the angle 60 (Figure 3), and prevent twisting of the parts. In general, it is preferred to join the lower stringer elements only by the webs thereof, as indicated in Figure 8, but additional strength adjacent the aileron, or in any other desired location, may be provided, as by means of plate 61 (Figures 3 and 5) to which the tip section 22 is attached.

In breaking, the tip section works on its upper edge as a fulcrum and breaks its inboard lower stringer joints (Figures 8 and 11). By making the rivet connections of suitable strength, the fracture load may be closely controlled. Continuing its movement, the tip section will separate at the main spar (Figure 9) and along its upper edge, the stress being progressively placed upon the various fastening elements, and will tear off, carrying the outboard aileron section 24 with it, by means of the hinge connection therein.

The skin parts along the line indicated in Figures 5 and 6, the outboard skin element being riveted to members 35 and 35' previously referred to and to similar members on the lower surface, not shown. The skin fastening is carried around the leading edge of the wing by element 62, to which the skin is also riveted. As will be understood, the fracture strength of the joint, including the skin riveting, will be such as to provide for separation at the desired wing loading.

What is claimed is:

1. An aircraft wing comprising a main inboard section terminating in a chordwise rib forming an enclosure for the end thereof, a tip section, the said inboard and tip sections having aligned spanwise structural elements, a fastening plate attached to said rib and to spanwise structural elements of the said inboard section, and means joining spanwise structural elements of the two said sections together and to the said fastening plate, the said means being breakable under a wing load within the safe load for the other elements of the wing.

2. In an aircraft wing of the type described, an inboard spar section, an outboard spar section, and means joining the said sections together and comprising angle members fastened to the inboard section and forming a slot for receiving the inboard end of the outboard section, and breakable means fastening the outboard section in the said slot.

3. In an aircraft wing of the type described, chordwise structural elements forming an inclosure for a main inboard wing section, a spar inboard of the said chordwise elements, a spar outboard of the said chordwise elements and continuing the said inboard spar, angle members joining the said inboard spar and chordwise elements and forming a slot for receiving the inboard end of the outboard spar, and breakable means fastening the outboard spar in the said slot.

4. In an aircraft wing of the type described, a rib forming an enclosure for a main inboard wing section, a spanwise structural element inboard of the said rib and connected thereto, a spanwise structural element outboard of the said rib and having a web extension passing through an aperture in the said rib, and breakable means attaching the said web extension to the first said spanwise element.

5. In an aircraft wing of the type described, a flanged rib forming an enclosure for a main inboard wing section, a spanwise structural element inboard of the said rib and fastened to the flange thereof, a fastening plate above said flange and also fastened thereto, and a spanwise structural element outboard of the said rib and breakably fastened to the said plate.

6. In an aircraft wing of the type described, a main inboard spar section, a tip spar section, rib elements fore and aft of said spar sections, and means joining said rib elements and spar sections together and comprising means for permitting separation of said tip spar section in flight.

WM. T. SCHWENDLER.
OSCAR ERLANDSEN, Jr.

REFERENCES CITED

The following references are of record in the file of this patent:

UNITED STATES PATENTS

| Number | Name | Date |
|---|---|---|
| 1,627,184 | Krammer | May 3, 1927 |
| 1,785,318 | Lambert | Dec. 16, 1930 |
| 1,801,202 | Krummel | Apr. 14, 1931 |
| 1,902,956 | Hughes | Mar. 28, 1933 |
| 2,283,223 | Nallinger | May 19, 1942 |
| 2,375,423 | Lobelle | May 8, 1945 |

OTHER REFERENCES

Report of Civil Aeronautics Board, file No. 2,905, Docket No. SA-78, published October 11, 1943, page 19. (Copy in Div. 22.)